Patented Oct. 18, 1927.

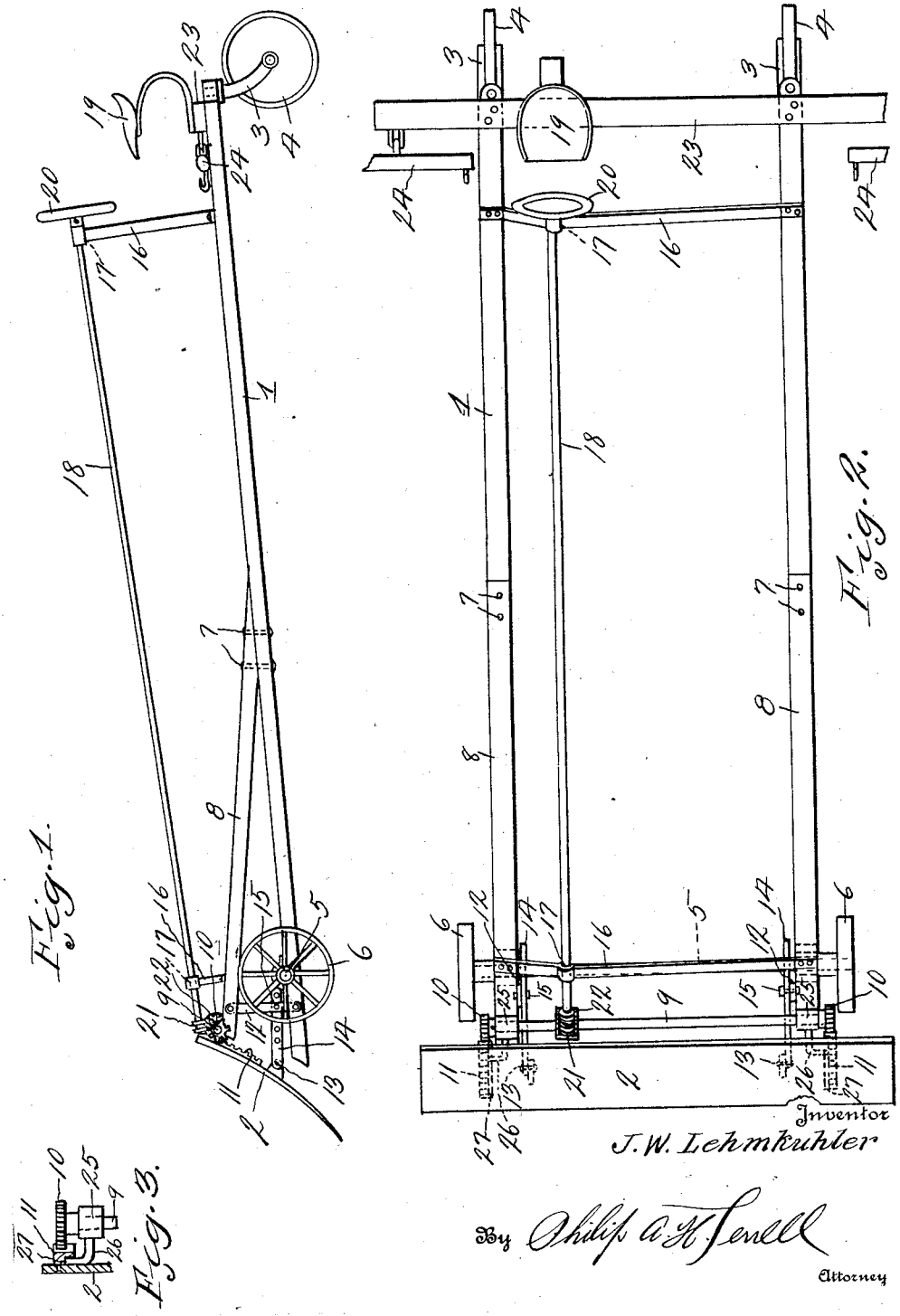

1,646,156

UNITED STATES PATENT OFFICE.

JOHN W. LEHMKUHLER, OF ARNOLD, NEBRASKA.

ROAD GRADING AND SCRAPING MACHINE.

Application filed October 17, 1925. Serial No. 62,995.

The invention relates to road grading and scraping machines, and has for its object to provide a device of this character to which draft animals may be attached adjacent its rear end and rearwardly of the scraping blade thereby allowing dirt to be scraped and forced ahead of the blade over a bank, without the necessity of the animals going down the bank, which is in many cases impossible.

A further object is to provide a road scraping machine comprising a downwardly and forwardly inclined frame, wheel supported, a transversely disposed scraper blade forwardly of the frame and provided on its rear face with a rack, with which rack pinions carried by a shaft mesh, and a rearwardly extending operating shaft having worm and worm gear connections with the shaft and forming means whereby said scraper blade may be adjusted upwardly or downwardly.

A further object is to provide adjustable link connections between the blade and the frame whereby the angle of the scraper blade may be varied.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the machine.

Figure 2 is a top plan view of the machine.

Figure 3 is a horizontal sectional view through a portion of the scraper blade and one of the racks showing means for preventing forward tilting of the scraper blade.

Referring to the drawing, the numeral 1 designates a rectangular frame of the machine, which frame inclines downwardly and forwardly towards the lower portion of the scraper blade 2. The frame 1 is supported, at its rear end, on pivoted brackets 3, which are provided with wheels 4, thereby facilitating a turning operation. Extending transversely of the frame 1 adjacent its forward end is an axle 5, on the outer ends of which wheels 6 are mounted for supporting the forward end of the machine. Secured to opposite sides of the frame 1 at 7 are forwardly and upwardly extending bars 8, which terminate adjacent the upper side of the scraper blade 2, for bracing said blade and for supporting the transversely disposed shaft 9, which is provided on its ends with gears 10, which mesh with racks 11 on the rear side of the scraper blade. The bars 8 are braced by means of vertically disposed braces 12, which are connected to the bars and to the frame 1. Pivotally connected to the rear side of the scraper blade 2 at 13 are rearwardly extending apertured links 14, which are connected to the brace members 12 by means of bolts 15, and by placing the bolts 15 through various apertures in the bars 14, it is obvious that the inclination of the scraper blade 2 may be varied according to the nature of the ground being worked.

Extending upwardly from the frame 1 adjacent its forward and rear end are brackets 16 in bearings 17 of which, a shaft 18 is rotatably mounted. The shaft 18 terminates adjacent the operators seat 19, and is provided with a hand wheel 20 adjacent to be grasped by the operator for rotating the shaft 18. The forward end of the shaft 18 is provided with a worm 21 which meshes with a worm gear 22 carried by the transversely disposed shaft 9, therefore it will be seen the operator can easily adjust the blade 2 upwardly or downwardly for varying the depth of cut taken by the blade and the blade will be in complete control of the operator at all times. Extending transversely of the frame 1 at its rear end is a bar 23, which extends beyond the opposite side of the frame 1, and has connected thereto single trees 24, to which draft animals may be connected for moving the machine forwardly. It will be seen that the draft animals are located rearwardly of the blade, consequently dirt can be scraped from a road and shoved over the bank without the draft animals going down the bank, which is often impossible. It will also be seen the device is simple in construction, parts reduced to a minimum and the machine may be cheaply manufactured and sold.

To prevent forward tilting of the upper end of the scraper blade 2 during a scraping operation and to maintain the arcuate racks 11 in mesh with the gears 10 on the shaft 9, the bearings 25 of the shaft 9 are provided with angularly shaped arms 26 which extend into the channel 27 in the inner sides of the arcuate racks 11, and which arms allow the racks to slide upwardly and downwardly and at the same time form means for holding the scraper blade 2 against forward tilting.

The invention having been set forth what is claimed as new and useful is:—

A road scraping machine comprising a wheel supported frame, a transversely disposed scraper blade forwardly of the frame, a transversely disposed shaft carried by the forward end of the frame, gears carried by the ends of said shaft, arcuate racks carried by the rear side of the blade and meshing with the gears, a worm gear carried by the transversely disposed shaft, a rearwardly extending operating shaft, a worm carried by the operating shaft and meshing with the worm gear, apertured links pivoted to the rear side of the blade and extending rearwardly, vertically disposed bars carried by the frame and with which the apertured links engage and securing bolts extending through apertures of the links and the vertically disposed bars.

In testimony whereof I hereunto affix my signature.

JOHN W. LEHMKUHLER.